Patented Jan. 6, 1948

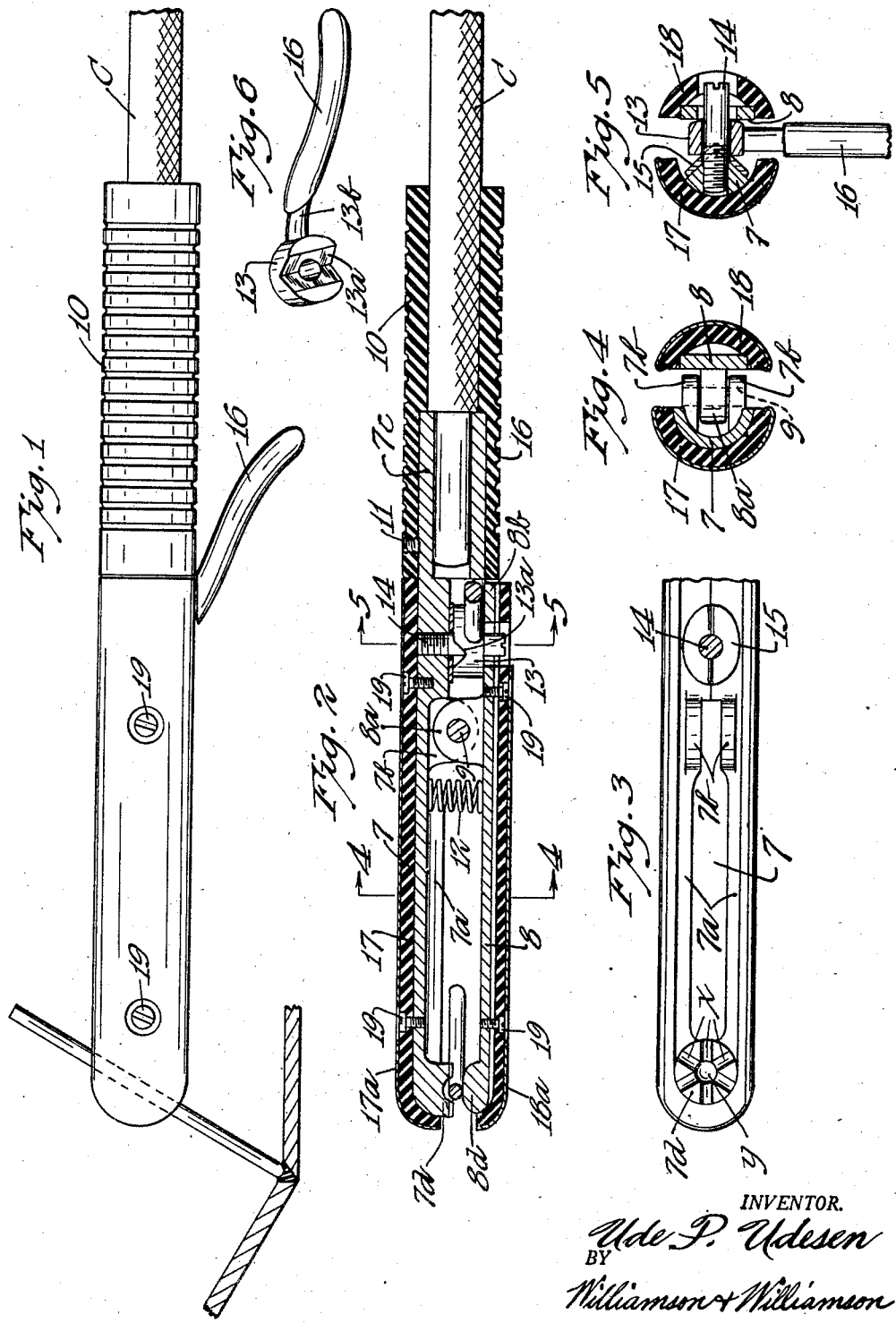

2,434,023

UNITED STATES PATENT OFFICE 2,434,023

ELECTRODE HOLDER FOR ARC WELDERS

Ude P. Udesen, St. Paul, Minn.

Application February 23, 1945, Serial No. 579,348

2 Claims. (Cl. 219—8)

This invention relates to electric arc welding and particularly to an improved and simplified welding tool constituting an electrode holder.

In electric arc welding, it is necessary to provide a compact, readily portable device for securely gripping the rod or electrode and one which may be accurately guided in making the weld. The electrodes are quite quickly consumed in arc welding and must be quickly replaced.

In view of the electrical current transmitted to the rod, the rod must be very firmly gripped to insure proper electric contact between the holder and rod and means must be provided for quickly ejecting or detaching the stub of a rod which has been used.

In most electrode holders for electric arc welding, a suitable insulated handle of generally cylindrical shape is provided having connected therewith, clamping means for detachably securing an electrode or rod thereto. The actual clamping portions of the holder are removed at some distances from the insulated handle to materially lessen the transmission of heat to the portion grasped by the operator. Clamping action of the jaws in most prior art devices is obtained through a strong spring which urges the clamping ends of the jaw members together. The various electrodes used vary somewhat in diameter and it is desirable that such electrode may be attached in a number of angular relations relative to the longitudinal center line of the holder. The cooperating clamping elements of most electrode holders widely used at this time, would not adequately or uniformly grip electrodes of somewhat different diameter in the various angulated positions. No positive means are provided for positively clamping the electrode between the clamping jaws.

It is an object of my present invention to provide a simple but highly efficient electrode holder for arc welding wherein the clamping elements of the jaws are normally urged apart but wherein a means readily operable from the handle is provided for positively moving said jaws together against an electrode and wherein said positive force may be applied throughout the welding operation.

A further object is the provision of a holder of the class described wherein a very efficient gripping action is secured through the cooperation of complementary jaw elements so constructed as to center and most effectively apply clamping pressure against opposite sides of a rod or electrode and to grip said rod with equal effectiveness when disposed in any one of a plurality of angular positions with reference to the longitudinal center line of the holding device.

A further object is the provision of an electrode holder for arc welding wherein discomfort from over-heating of the instrument as well as danger of injury from sparks, is substantially eliminated and wherein the conductor and electric connections in the instrument itself, are well shielded and insulated.

More specifically, it is an object to provide an improved electrode holder and welding instrument which utilizes a swingable jaw lever or the equivalent pivoted and opposed to a stationary jaw member, said jaw members having opposed clamping elements adjacent the outer ends thereof and powerful camming means being provided between said jaw members disposed at the rear or inner end of the fulcrumed jaw lever and disposed rearwardly of the fulcrum whereby the jaw lever may be positively forced inwardly at its gripping end and retained there with positive force to grip the electrode throughout the welding operation.

A further object is the provision of an electrode holder of the class described wherein said camming member is provided with an operating arm disposed in juxtaposition to a side of the handle for convenient manipulation by the thumb or fingers of the hand which holds the tool.

A still further object is the provision of a streamlined electrode holder of relatively small cross sectional shape throughout and the entire body of which including the gripping jaws and handle are disposed longitudinally in a substantial straight line to enable the device to be accurately and conveniently manipulated and to apply the welding rod or electrode for work in crowded corners or spaces and to enable the device to be projected through relatively small apertures.

These and other objects and advantages of my invention will be more apparent from the following description made in connection with the accompanying drawings, wherein like reference characters refer to the same parts throughout the several views and in which:

Fig. 1 is a side elevation view of an embodiment of my invention having an electrode gripped thereby and showing the use of the device on a piece of work;

Fig. 2 is a view mostly in longitudinal section with the electrode holder turned 90° on its axis from the position shown in Fig. 1;

Fig. 3 is a bottom plan view showing the upper or stationary jaw with the lower jaw detached;

Fig. 4 is a cross section taken on the line 4—4 of Fig. 2 looking in the direction of the arrows; and Fig. 5 is a cross section taken on the line 5—5 of Fig. 2 showing the camming mechanism actuating the swingable jaw member; and Fig. 6 is a perspective view of the camming element and its operating arm detached.

In the embodiment of the invention illustrated, I provide an elongated, stationary jaw member 7 which also constitutes the body of the entire device. Member 7 is constructed of metal such as brass, copper, bronze or aluminum which has high electrical conductive properties and is of substantial cross sectional area and substance to constitute the main conductor of electricity from the connection of the device, through an electric cable C with the source. Jaw member 7a has a pair of spaced ribs depending from its longitudinal edges and has formed in the rear portions thereof, apertured transversely aligned bosses 7b which are adapted to be pivotally connected with the swingable, elongated jaw member 8. The jaw member 8 is constructed of a bar or relatively thick strip of metal or other suitable material having a comparatively high degree of resiliency, such as spring steel and is aligned longitudinally of my device with the fixed jaw 7 and carries at its inner end, a laterally extending ear 8a which is adapted to be disposed between the apertured bosses 7b of the fixed jaw 7. A pivot pin 9 pivotally connects the ear 8a with said bosses 7b thereby mounting the swingable or lever jaw 8 for variable swinging movement relative to the fixed jaw. The swingable or lever jaw member 8 has a short inner end 8b which projects a short distance inwardly or rearwardly of the pivot ear 8a and which as later will be shown, is adapted to be engaged and cammed by an efficient camming mechanism for swinging the jaw lever to cause the outer end thereof to be forced toward the outer end of the fixed jaw to cooperatively clamp or grip an electrode or rod.

The body or stationary jaw 7 carries at its rear end, a heavy preferably integrally formed collar 7c which is drilled partially through its length to constitute a socket for receiving and retaining the inner end of the electrical cable C. A detachable handle 10 constructed of heat insulating or di-electric material surrounds the collar 7c as well as the inner end of the electrical cable C and is detachably secured to said collar by suitable means such as set screw 11.

The socket formed internally by collar 7c is of a diameter to snugly engage the inner end of the service cable and an excellent electrical connection may be made by sweating in the cable in the socket or if desired, the connection may be made by loosely inserting the end of the cable and then utilizing a set or jam screw to efficiently clamp the cable against the greater part of the inner periphery of the socket. The rod gripping or clamping elements are positioned in opposed relation at the outer end of the device integrally formed or otherwise rigidly secured to the outer ends of the fixed and swingable jaws 7 and 8. I provide a pair of aligned cooperating elements particularly well conceived to center and correctly apply clamping pressure to rods varying considerably in diameter and to permit holding of a rod in the device at various angular relations relative to the longitudinal center line of the holder. To this end, one of the jaws of my device (as shown here the fixed jaw 7), carries at its outer end, a lateral projecting gripping element 7d which has its gripping face as shown in Figs. 2 and 3 formed by a plurality of intersecting grooves X, said face of the element 7d lying preferably in a plane and the grooves being of substantial semi-circular cross sectional shape and of the same depth. This leaves in the gripping element, a central recess or depression Y through the intersection of the several grooves. In the form shown, three of such diametric grooves are utilized, making possible the holding of rods in five different positions relative to the body of the device, one of those positions being a straight line, longitudinal position and the other four positions being disposed with the greater portion of the length of the rod at suitable different angulations with reference to the instrument and of course, to the work to be processed.

The cooperating gripping or clamping element 8d projects laterally from the outer end of the swingable jaw member 9 and comprises a semi-ball shaped element or solid convex member axially aligned with the cooperating gripping element 7d so that pressure is always applied from the jaw element 8d at theoretically a point against one side of a rod, such point being in alignment during the closing operation of the jaws with the depressed or recessed portion of the opposing element and centrally of the grooves.

With my structure, the hinged jaw 8 is normally urged apart from the fixed jaw 7 by resilient means such as a strong compression spring 12, the ends of which may be interposed between lever jaw 8 and a shallow socket formed in the under portion of fixed jaw 7, said spring being disposed as shown, somewhat forwardly of the pivotal joint 9.

I provide a powerful and positive means for clamping the cooperating gripping elements 7d and 8d together about the rod to be held. To this end, a small cylindrical camming member 13 is disposed between the shorter and inner ends of jaw members 7 and 8 pivoted for oscillation on a pivot screw 14 which extends transversely of the body and as shown, is screw threaded into the heavy rearward portion of the fixed jaw member 7 a short distance forwardly of the handle attachment collar. The camming member 13 has a grooved camming element 13a extending diametrically thereacross and has a gradual sloping V-shape groove adapted to cooperate with a rigid, stationary body 15 constituting a rib as shown on the inner portion of the body or stationary jaw 7 and extending longitudinally thereof, as clearly shown in Figs. 3 and 5. The wearing surface of the cooperating V-shaped rim 15 is preferably constructed of hardened steel, to resist wear in the camming operation and this rib complementarily fits the V-shaped camming surface of the element 13 when the latter is oscillated to non-clamping position. An operating arm 13b is rigidly affixed to the camming member 13 and extends more or less radially thereof externally of the device and handle and is preferably covered with a di-electric and heat insulating sleeve 16. The outer end of the arm is shaped and positioned to be disposed in juxtaposition to the forward portion of the handle for convenient swinging by thumb or finger when the device is held for operation. The diametrically extending camming groove 13a is properly angled with respect to the radial portion of operating arm 13b so that in the operative or extreme cammed position of element 13, the arm will be moved into its closest relation to the adjacent portion of the handle.

Both the stationary and swingable jaws 7 and 8 are covered at their exterior surfaces by insulating shields 17 and 18 respectively, constructed of heat insulating and di-electric material, such shields being shaped to conform to the outer longitudinal surfaces as well as the marginal edges and forward ends of the two jaw members. Said shields are detachably connected with the jaw members by screws 19. I prefer to cover both of the shielding members 18 with metal or plastic sheet material 17a and 18a respectively, it being noted that the shielding of the forward ends of the jaw members is obtained to prevent sparks from the application of the electrode to the work, from injuring the metal jaws.

To install an electrode, the cam operating lever 13b is first retracted to the position shown in Fig. 5 with the camming groove 13a of element 13 complementarily fitting the V-shaped ridge 15 of the body member. In this position, coil spring 12 urges the outer ends of the jaws apart, the elements 7d and 8d being sufficiently spaced for easy reception of a rod or electrode therebetween.

To attach a rod, the same is laid in the appropriate channel or groove X to position the greater length of the rod in the desired angled relationship to the jaw members. The cam lever 13 is then conveniently retracted by thumb or fingers of the hand holding the device and in so doing, the cylindrical camming element 13 is turned beyond engagement with the V-shaped rib 15 and is thereby locked in the cammed position, arm 13b then being positioned closely adjacent handle 10, as shown in full lines in Fig. 1.

By constructing the swinging jaw lever 8 of spring steel or other suitable resilient material, I am able to positively apply clamping pressure and retain the same upon electrodes varying within all presently used ranges. The heavy plate or jaw lever 8 is tensioned to some extent in application of clamping pressure through the positive force of the camming element 13 and there is sufficient yieldability because of the length and resilient nature of clamping lever to positively apply proper clamping action upon electrodes varying from $\frac{1}{16}$ to $\frac{5}{16}$ of an inch in diameter.

In this connection, it is to be noted that the smaller the rod used, the less current it carries and consequently, the less actual clamping pressure is required for proper electrical connection. Thus, with the heavier rods, a greater positive clamping pressure is obtained from my device.

In the application of clamping pressure to the rod, it will be noted that one side of the rod is actually engaged by the two portions of the particular diametric groove utilized at opposite sides of the central recess Y. The cooperating clamping pressure is applied centrally or axially of the element 7d through the convex or ball member 8d, the high point of which is axially aligned with the recess or center Y of the jaw element 7d. Thus pressure is applied in all cases on one side of the rod at a point centrally of the two areas engaged by the groove X at the opposite side of the rod and for this reason, regardless of the diameter of the rod or the particular groove X utilized, whereby clamping pressure and consequently, electric connection with the conductive fixed jaw 7, are obtained in the most efficient manner.

With my device, after the electrode is clamped in the desired position, the camming element has been locked into place and it is not necessary to hold the operating arm 13b during the welding operation on the work. Upon releasing operating arm 13a by swinging the same forwardly, the swingable jaw is released and the compressed spring 12 urges the outer portions of the jaws apart to release the electrode.

The convenience and simplicity of operation of my device is an important feature of my invention. New electrodes may be installed at desired angulated positions by merely swinging the operating arm 13a with finger or thumb pressure towards the handle. Ejection of a consumed rod is equally convenient since upon retraction of the operating arm, the coil spring releases the clamping elements of the jaws. Such ease of operation is quite in contrast to the electrode holders now extensively used.

With my device, it will be seen that all parts of the holder including the body, swingable jaw, handle and cam operating arm, are all disposed in stream lined and longitudinal fashion within very small compass. The instrument can therefore, be used upon work positioned in a small corner, within an aperture or in places and positions where it is difficult to apply an electrode with devices now extensively utilized. My tool is well balanced throughout and because of the straight handle and continuation of the straight line construction and the attachment and positioning of the jaws and electrode, in any of the angulated positions, can be very accurately applied to the line or area of the work to be welded.

It will further be seen that all of the parts of the device are readily detachable and easily replaced and repaired, the parts being readily dissembled by release of one or more screws.

It will of course, be understood that various changes may be made in the form, details, arrangement and proportions of the parts without departing from the scope of my invention.

What I claim is:

1. An electrode holder for electric arc welding comprising a pair of opposed jaw members carrying at their outer ends, opposed cooperating electrode clamping elements, one of said elements being of circular configuration and having an annular clamping surface provided with a series of radially arranged electrode engaging grooves and having a central depression with which the ends of said grooves communicate, the other of said elements comprising precisely a substantially semi spherical member disposed in axial alignment with said first mentioned element and means for clamping the outer ends of said jaw members together.

2. An electrode holder for electric arc welding comprising a cylindrical non-conductive holder, an elongated, resilient stationary jaw member fixed to said handle and extending longitudinally therefrom and having a jaw element adjacent its outer end, an elongated, resilient, swingable jaw lever pivoted adjacent its inner end to said first jaw member and opposed thereto and having a cooperating jaw element opposed to said first mentioned jaw element, resilient means interposed between said jaw members for separating the same, a camming member interposed between the inner ends of said jaw members inwardly of the pivot between said members and oscillatable on an axis extending diametrically to said handle for forcing the outer ends of said jaw members together and maintaining the same in clamping relationship, one of said jaw members having an annular clamping surface provided with a series of diametric pairs of radially arranged electrode-engaging grooves and having a central recess with which the ends of said grooves communicate, the other of said jaw elements comprising precisely, a semi-spherical member disposed in axial alignment with said first mentioned element and adapted to apply pressure to an electrode between the portions of said electrode engaged by a pair of said radially arranged grooves of said first jaw element whereby through the cooperation of said specific jaw elements and said elongated, resilient jaws with said camming element, electrodes varying considerably in diameter, may be positively clamped in a variety of different angular positions relative to said handle.

UDE P. UDESEN.

REFERENCES CITED

The following references are of record in the file of this patent:

UNITED STATES PATENTS

| Number | Name | Date |
|---|---|---|
| 1,313,572 | Baker et al. | Aug. 19, 1919 |
| 1,493,864 | Orr | May 13, 1924 |
| 1,851,039 | Fausek et al. | Mar. 29, 1932 |
| 1,839,500 | Rich | Jan. 5, 1932 |
| 2,179,440 | Wagner | Nov. 7, 1939 |
| 2,294,321 | Schulfer | Aug. 25, 1942 |
| 2,336,712 | Bourque | Dec. 14, 1943 |
| 2,358,800 | Fuller | Sept. 26, 1944 |